US011176398B2

(12) United States Patent
Lee et al.

(10) Patent No.: US 11,176,398 B2
(45) Date of Patent: Nov. 16, 2021

(54) METHOD OF DETECTING REGION OF INTEREST ON BASIS OF GAZE DIRECTION AND ELECTRONIC DEVICE THEREFOR

(71) Applicant: Samsung Electronics Co., Ltd., Gyeonggi-do (KR)

(72) Inventors: Kyehwan Lee, Gyeonggi-do (KR); Gounyoung Kim, Gyeonggi-do (KR); Heejung Jung, Gyeonggi-do (KR); Soonyeon Choi, Gyeonggi-do (KR); Youngkyoo Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/968,236

(22) PCT Filed: Feb. 7, 2019

(86) PCT No.: PCT/KR2019/001531
§ 371 (c)(1),
(2) Date: Aug. 7, 2020

(87) PCT Pub. No.: WO2019/156480
PCT Pub. Date: Aug. 15, 2019

(65) Prior Publication Data
US 2021/0034904 A1 Feb. 4, 2021

(30) Foreign Application Priority Data
Feb. 8, 2018 (KR) ........................ 10-2018-0015819

(51) Int. Cl.
*H04N 5/44* (2011.01)
*G06K 9/20* (2006.01)
(Continued)

(52) U.S. Cl.
CPC ....... *G06K 9/2054* (2013.01); *G06K 9/00315* (2013.01); *H04N 5/23238* (2013.01)

(58) Field of Classification Search
CPC ............. G06K 9/2054; G06K 9/00315; G06K 9/00248; G06K 9/00597; H04N 5/23238;
(Continued)

(56) References Cited

U.S. PATENT DOCUMENTS 7,460,150 B1 * 12/2008 Coughlan .............. H04N 7/147
348/169
8,228,364 B2 7/2012 Cilia
(Continued)

FOREIGN PATENT DOCUMENTS

KR 1020160068916 6/2016
KR 1020170129048 11/2017

OTHER PUBLICATIONS

PCT/ISA/210 Search Report issued on PCT/KR2019/001531, dated May 30, 2019, pp. 5.
(Continued)

*Primary Examiner* — Howard D Brown, Jr.
(74) *Attorney, Agent, or Firm* — The Farrell Law Firm, P.C.

(57) ABSTRACT

Disclosed is an electronic device comprising a communication circuit, a memory, and a processor. The processor may be set to obtain an omnidirectional image, identify at least one face in the omnidirectional image, obtain at least one gaze direction from the at least one face, and generate at least one region of interest of the omnidirectional image on the basis of the at least one gaze direction. Also, various other embodiments specified throughout the present specification may also be possible.

14 Claims, 11 Drawing Sheets

(51) Int. Cl.
*G06K 9/00* (2006.01)
*H04N 5/232* (2006.01)

(58) Field of Classification Search
CPC ............. H04N 5/2628; H04N 5/23219; H04N 5/23229; G06T 7/11
See application file for complete search history.

(56) References Cited

U.S. PATENT DOCUMENTS

| | | | |
|---|---|---|---|
| 9,020,825 B1 | 4/2015 | Garber | |
| 9,262,800 B2 | 2/2016 | Cilia | |
| 9,401,144 B1 | 7/2016 | Garber | |
| 9,922,253 B2 | 3/2018 | Absun et al. | |
| 10,126,813 B2 | 11/2018 | Rainisto | |
| 2006/0187305 A1* | 8/2006 | Trivedi | G06K 9/00241 348/169 |
| 2012/0236112 A1 | 9/2012 | Cilia | |
| 2016/0073025 A1 | 3/2016 | Cilia | |
| 2016/0259977 A1 | 9/2016 | Asbun et al. | |
| 2017/0012591 A1 | 1/2017 | Rider et al. | |
| 2017/0085861 A1 | 3/2017 | Rainisto | |
| 2017/0127008 A1* | 5/2017 | Kankaanpaa | H04N 5/23238 |
| 2017/0270635 A1* | 9/2017 | Chun | G06F 3/012 |
| 2017/0330332 A1 | 11/2017 | Choi et al. | |
| 2018/0020202 A1* | 1/2018 | Xu | H04N 13/106 |
| 2018/0211112 A1 | 7/2018 | Asbun et al. | |
| 2019/0335115 A1* | 10/2019 | Kumai | G09G 5/377 |

OTHER PUBLICATIONS

PCT/ISA/237 Written Opinion issued on PCT/KR2019/001531, dated May 30, 2019, pp. 6.

* cited by examiner

METHOD OF DETECTING REGION OF INTEREST ON BASIS OF GAZE DIRECTION AND ELECTRONIC DEVICE THEREFOR

PRIORITY

This application is a National Phase Entry of PCT International Application No. PCT/KR2019/001531 which was filed on Feb. 7, 2019, and claims priority to Korean Patent Application No. 10-2018-0015819, which was filed on Feb. 8, 2018, the entire content of each of which is incorporated herein by reference.

TECHNICAL FIELD

Various embodiments disclosed in the disclosure relate to a method for detecting a region of interest based on a gaze and an electronic device therefor.

BACKGROUND ART

To improve user experience and immersion, a plurality of content including a 360 image have been made. The 360 image may be an image including, for example, an omnidirectional image. A viewer may view an image corresponding to a desired direction by changing a viewing region of the 360 image. For example, the viewer may change a viewing region based on a navigation interface, a change in gaze, an input on a screen (e.g., a drag input), or the like.

Because the 360 image includes the omnidirectional image, to view an event of a region departing from the viewing region, the viewer should perform an operation of changing the viewing region.

DISCLOSURE

Technical Problem

To indicate occurrence of an event on a 360 image to a viewer, a notification based on a region of interest may be used. To provide a notification, a setting of the region of interest for the 360 image may be performed in advance. For example, the region of interest may be set by a content creator. It may take a great deal of time to set a plurality of regions of interest. Furthermore, when the 360 image is streamed in real time, the content creator may fail to set a separate region of interest.

Various embodiments disclosed in the disclosure may provide a method for improving user experience in making and appreciating images by detecting a region of interest based on a gaze and an electronic device therefor.

Technical Solution

In accordance with an aspect of the disclosure, an electronic device is provided. The electronic device may include a communication circuitry, a memory, and a processor operatively connected to the communication circuitry and the memory. The processor may be configured to obtain an omnidirectional image, identify at least one face from the omnidirectional image, obtain at least one gaze from the at least one face, and generate at least one region of interest of the omnidirectional image based at least on the at least one gaze.

In accordance with another aspect of the disclosure, a method for generating a region of interest is provided. The method may include obtaining an omnidirectional image, identifying at least one face from the omnidirectional image, obtaining at least one gaze from the at least one face, and generating at least one region of interest of the omnidirectional image based at least on the at least one gaze.

Advantageous Effects

According to various embodiments disclosed in the disclosure, a region in which a viewer may be interested in may be easily set by setting a region of interest based on a gaze.

Furthermore, according to various embodiments, a region of interest according to an intention of a photographer may be set by setting a region of interest based on a gaze of the photographer.

Furthermore, according to various embodiments, a setting of a dynamic region of interest may be performed by setting a region of interest based on a gaze.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
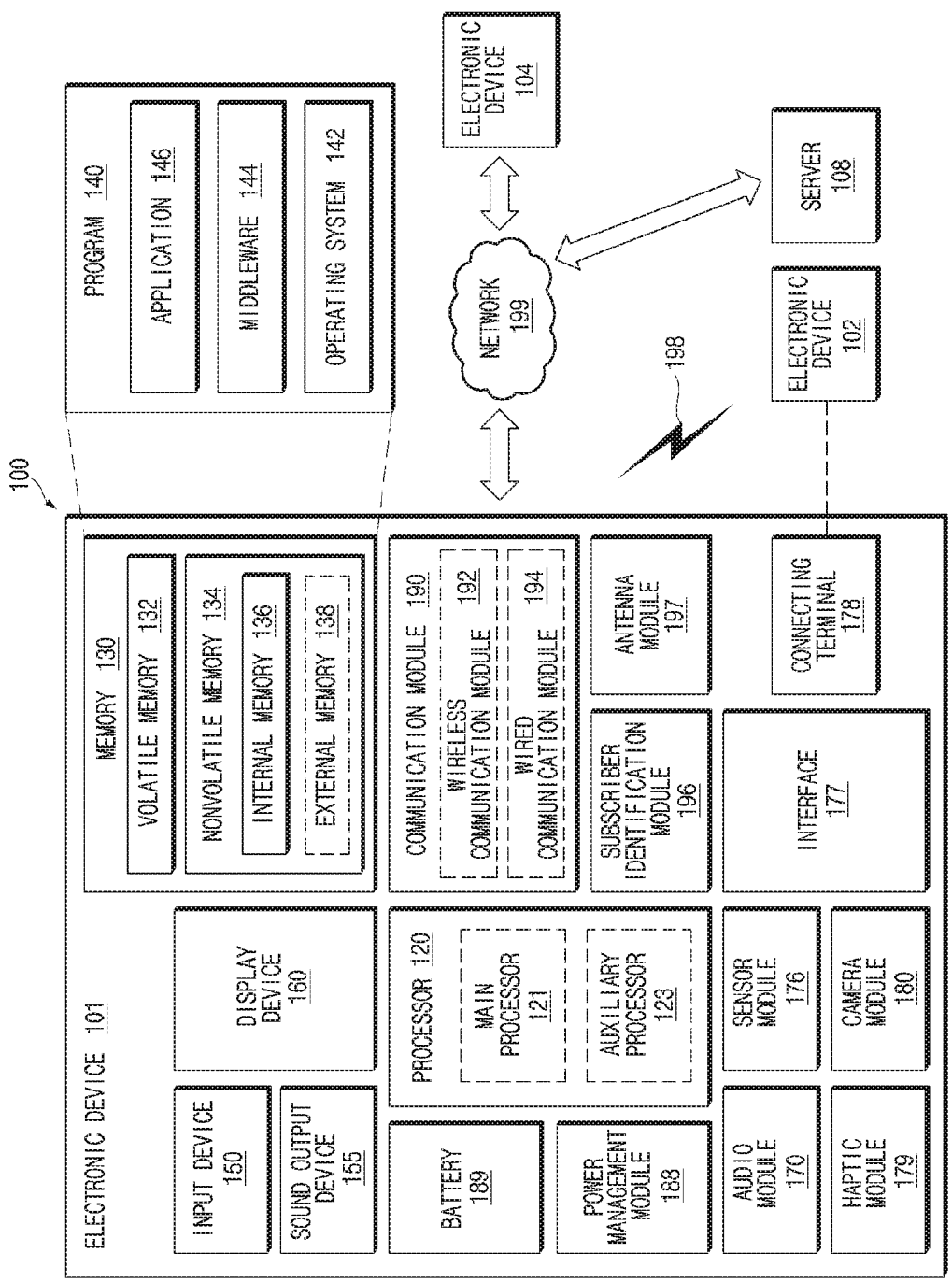
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various Operations of an electronic device 101, which will be described below, may be performed by a processor 120. For example, the processor 120 may control operations of the electronic device 101 based on instructions stored in a memory 130.

Figure 2:
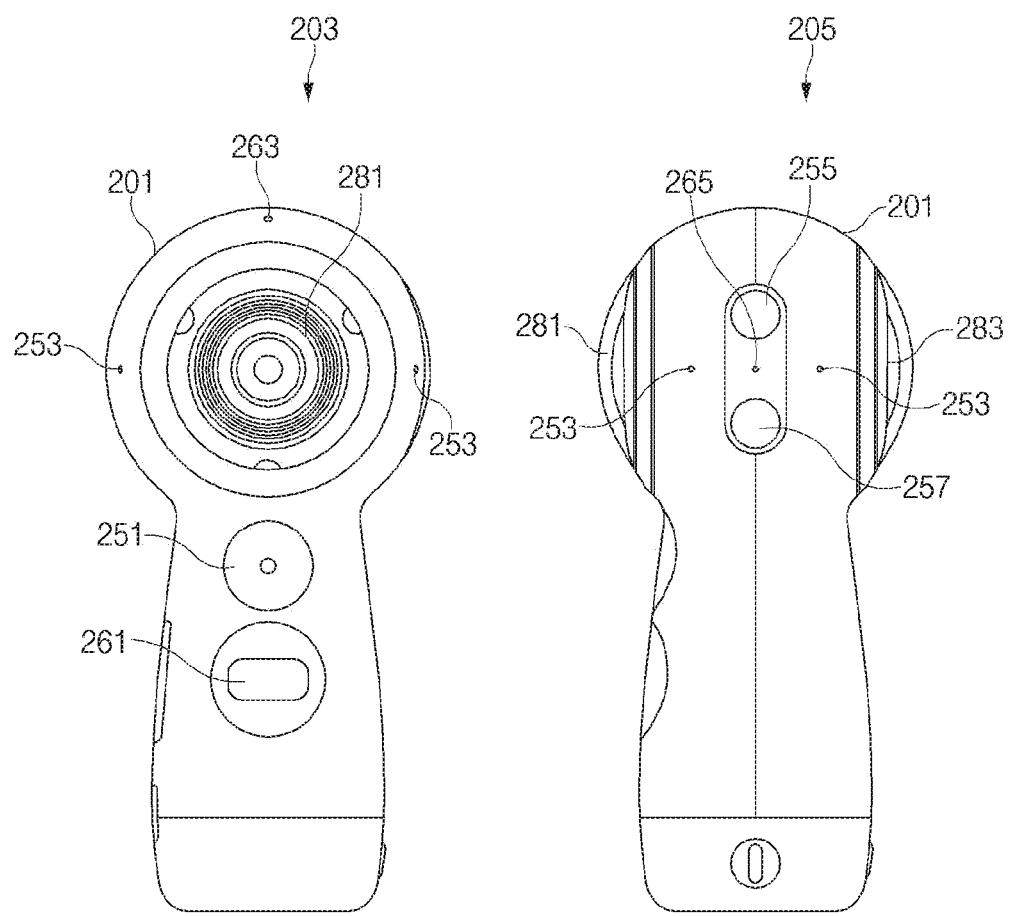
FIG. 2 is a drawing of a configuration of an electronic device according to various embodiments.

FIG. 2 is a drawing of a configuration of an electronic device according to various embodiments.

According to various embodiments, an electronic device 201 (e.g., an electronic device 101 of FIG. 1) may be a camera device capable of obtaining an omnidirectional image. For example, the omnidirectional image may refer to an image capable of viewing all directions. For example, the omnidirectional image may be referred to as a 360 image or an immersive image.

In embodiments below, a recommended viewing direction may refer to a direction for a specific region which is recommended to a viewer for viewing from a specific viewpoint. For example, the recommended viewing direction may be set by a content creator or may be set based on a specified algorithm.

In embodiments below, a point of observation may refer to a center point of observation or capture of the entire image. For example, the point of observation may correspond to a location of the electronic device 201. For example, the point of observation may refer to a rendering center point of the entire image.

In embodiments below, a region of interest (RoI) may refer to a region in which a viewer may be interested or a region intended for the interest of the viewer. For example, the region of interest may include at least one point of interest (PoI). According to an embodiment, the region of interest may have a specified form (e.g., a circle, a triangle, a quadrangle, a rhombus and/or a polygon) or a form of an object corresponding to the region of interest.

In embodiments below, stitching may refer to a process of combining a plurality of images captured by multiview into one image.

According to various embodiments, information about the recommended viewing direction, the point of observation, the region of interest, and/or the point of interest may be included in metadata for an omnidirectional image.

Referring to reference number 203, according to various embodiments, the electronic device 201 may include a front camera 281 (e.g., a camera module 180) capable of obtaining a forward image of the electronic device 201, a first input interface 251 (e.g., an interface 177), a microphone 253 (e.g., an input device 150) capable of receiving a sound, a status light 263 (e.g., a display device 160) indicating a state of the front camera 281, and a camera state screen 261 (e.g., the display device 160). For example, the first input interface 251 may be a physical button for receiving the OK input, an image capture input, and/or an image capture stop input.

Referring to reference numeral 205, according to various embodiments, the electronic device 201 may include a rear camera 283 capable of obtaining a backward image of the electronic device 201, a second input interface 255 (e.g., the interface 177), a third input interface 257 (e.g., the interface 177), and an indication light 265 (e.g., the display device 160) indicating a state of the electronic device 201. For example, the second input interface 255 may correspond to a menu input, and the third input interface 257 may correspond to a power input.

According to various embodiments, the electronic device 201 may generate an omnidirectional image using the front camera 281 and the rear camera 283. The configuration of the electronic device 201 shown in FIG. 2 is illustrative, and the configuration of the electronic device 201 is not limited to the configuration of FIG. 2. According to an embodiment, the electronic device 201 may generate an omnidirectional image using one camera unit or a plurality of camera units. According to an embodiment, the electronic device 201 may further include other components which are not shown in FIG. 2. For example, the electronic device 201 may include a voice output means for outputting a sound. For example, the electronic device 201 may further include a connector (e.g., a USB or a USB type C) for connection with an external electronic device (e.g., the electronic device 101 of FIG. 1), a memory (e.g., SD memory, micro SD memory, and the like) slot, a battery slot, and the like.

According to an embodiment, the electronic device 201 may generate an omnidirectional image, and may store the image in the memory or may transmit the image to the external electronic device. For example, the electronic device 201 may generate an omnidirectional image with high definition (HD), full HD, ultra HD, or resolution clearer than the ultra HD. According to an embodiment, the electronic device 201 may generate one or more partial images for generating an omnidirectional image and may transmit the partial images to the external electronic device. For example, the external electronic device may generate the omnidirectional image by stitching the one or more received partial images.

Figure 3:
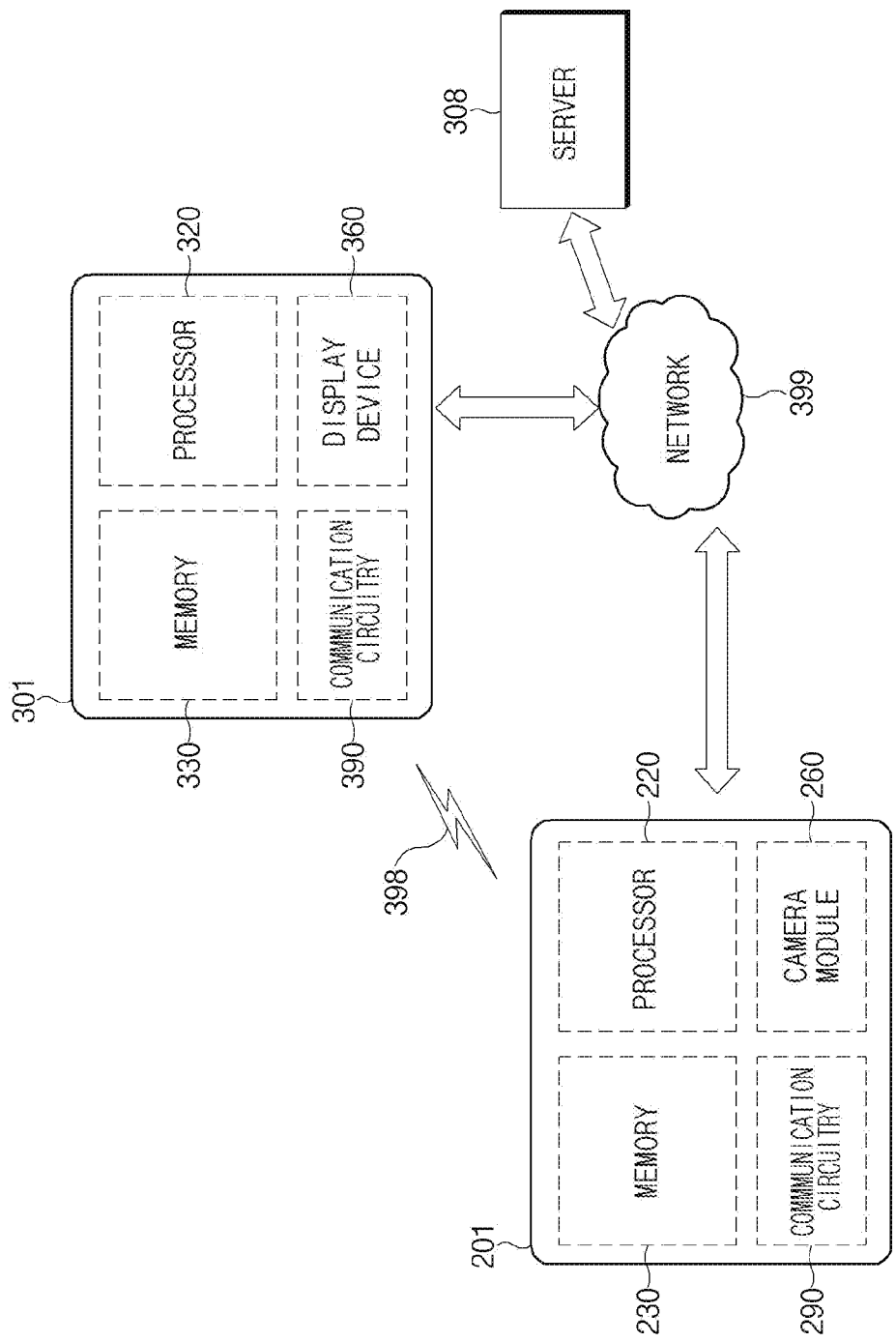
FIG. 3 illustrates a configuration of an exemplary electronic device in various environments according to various embodiments.

FIG. 3 illustrates a configuration of an exemplary electronic device in various environments 300.

In the embodiment of FIG. 3, an electronic device 201 and an external electronic device 301 may include the same or similar components to an electronic device 101 of FIG. 1. According to an embodiment, the external electronic device 301 may be omitted.

According to various embodiments, an electronic device 201 (e.g., an electronic device 101 of FIG. 1) may include a communication circuitry 290 (e.g., a communication module 190), a processor 220 (e.g., a processor 120), a memory 230 (e.g., a memory 130), and a camera module 280 (e.g., a camera module 280). For example, the processor 220 may be electrically or operatively connected with the memory 230, the communication circuitry 290, the camera module 280, and other components which are not shown in FIG. 3.

The configuration of the electronic device 201 shown in FIG. 3 is illustrative, and the electronic device 201 may further include other components which are not shown in FIG. 3.

According to various embodiments, the processor 220 may control other components (e.g., the memory 230, the camera module 280, and the communication circuitry 290) of the electronic device 201. For example, the processor 220 may control other components based on instructions stored in the memory 230. According to various embodiments, the processor 220 may be composed of a plurality of processors. For example, the processor 220 may include a dedicated processor for image processing. For example, the processor 220 may be implemented with one chip or a plurality of chips.

According to various embodiments, the camera module 280 may include at least one camera for obtaining an omnidirectional image. According to an embodiment, the camera module 280 may include a front camera (e.g., a front camera 281 of FIG. 2) for obtaining a forward image and a rear camera (e.g., a rear camera 283 of FIG. 2) for obtaining a backward image. According to an embodiment, the camera module 280 may obtain an image for a partial orientation under control of the processor 220. For example, the camera module 280 may enable only at least one of a plurality of cameras. According to an embodiment, the processor 220 may obtain a still image or a moving image for at least one direction using the camera module 280. According to an embodiment, the processor 220 may store an image obtained using the camera module 280 in the memory 230.

According to various embodiments, the communication circuitry 290 may provide a connection to a network 399 (e.g., a network 199 of FIG. 1) and a network 398 (e.g., a network 198 of FIG. 1). According to an embodiment, the processor 220 may transmit data to a server 308 (e.g., a server 108 of FIG. 1) or may receive data from the server 308, using the communication circuitry 290. For example, the network 399 may include a cellular network, a short-range wireless network (e.g., WiFi), and/or any network having an Internet connection. According to an embodiment, the processor 220 may transmit data to the external electronic device 301 or may receive data from the external electronic device 301, using the communication circuitry 290. For example, the network 398 may include WiFi, WiDi, near field communication (NFC), Bluetooth, and/or Bluetooth low energy. According to an embodiment, the communication circuitry 290 may provide communication with the external electronic device 301 through a wired connection.

The configuration of the electronic device 201 shown in FIG. 3 is illustrative, and the configuration of the electronic device 201 is not limited thereto. According to an embodiment, the electronic device 201 may include a power device such as a battery.

According to various embodiments, the external electronic device 301 (e.g., the electronic device 101) may include a memory 330 (e.g., the memory 130), a processor 320 (e.g., the processor 120), a display device 360 (e.g., a display device 160), a communication circuitry 390 (e.g., the communication module 190). For example, the processor 320 may be electrically or operatively connected with the memory 330, the communication circuitry 390, the display device 360, and other components which are not shown in FIG. 3. The configuration of the external electronic device 301 shown in FIG. 3 is illustrative, and the external electronic device 301 may further include other components which are not shown in FIG. 3.

According to various embodiments, the processor 320 may control other components (e.g., the memory 330, the communication circuitry 390, and the display device 390) of the external electronic device 301. For example, the processor 320 may control other components based on instructions stored in the memory 330. According to various embodiments, the processor 320 may be composed of a plurality of processors. For example, the processor 320 may include a dedicated processor for image processing. For example, the processor 320 may be implemented with one chip or a plurality of chips.

According to various embodiments, the communication circuitry 390 may provide a connection to the network 399 and the network 398. According to an embodiment, the processor 320 may transmit data to the server 308 or may receive data from the server 308, using the communication circuitry 390. According to an embodiment, the processor 320 may transmit data to the electronic device 201 or may receive data from the electronic device 201, using the communication circuitry 390.

According to various embodiments, the processor 320 may display image data received from the electronic device 201 on the display device 360. For example, the external electronic device 301 may operate in a state where it interworks with the electronic device 201. For example, the external electronic device 301 may play a role as a view finder capable of providing an image obtained by the electronic device 201 in real time. According to an embodiment, the processor 320 may display image data received from the server 308 on the display device 360. For example, the electronic device 301 may operate as an image viewer.

The configuration of the external electronic device 301 shown in FIG. 3 is illustrative, and the configuration of the electronic device 301 is not limited thereto. According to an embodiment, the external electronic device 301 may include a power device such as a battery.

According to various embodiments, the processor 220 may store image data in the memory 230. According to an embodiment, the processor 220 may stitch at least one image obtained using the camera module 280 and may map the stitched image onto a projection layer of a specified form to generate image data. For example, the projection layer may be a spherical mesh layer. According to an embodiment, the processor 220 may store at least one image obtained using the camera module 280 in the memory 230.

According to various embodiments, the processor 220 may store metadata in the memory 230. According to an embodiment, the processor 220 may generate at least one region of interest from an image obtained by the camera module 280 or an image stored in the memory 230 and may include information about the region of interest in metadata. According to an embodiment, the processor 220 may identify at least one object from an image and may generate a region of interest based on the identified object (e.g., a face or the like). According to an embodiment, the processor 220 may generate a region of interest based at least on a gaze of the identified face.

According to various embodiments, the metadata may include at least one of view point information, point of interest information, region of interest information, or event information. According to various embodiments, the metadata may be dynamically changed for each frame or sample. According to an embodiment, an information type of the metadata may be indicated by a guided_metadata value. For example, the value of the guided_metadata according to an embodiment may be set as Table 1 below.

TABLE 1

| Value | Note |
| --- | --- |
| 0x00 | Reserved |
| 0x01 | Multi-viewport |
| 0x02 | Point of interest |
| 0x03 | Region of interest |
| 0x04 | Event |
| 0x05-0xFF | Reserved |

According to an embodiment, the view port information may include a view port identifier, display location information of a view port (e.g., information about a location of at least one edge in a viewing region of an omnidirectional image, when the omnidirectional image is played), or view port size information (e.g., width and height information), with respect to at least one view port. For example, the view port display location information may include a horizontal offset from the left of the viewing region and a vertical offset from the top of the viewing region.

According to an embodiment, the point of interest information may include at least one of a point of interest identifier or point of interest location information (e.g., point of interest yaw and/or point of interest pitch), with respect to at least one point of interest.

According to an embodiment, the region of interest information may include at least one of field of view information, a region of interest identifier, region of interest start location information (e.g., start pitch and yaw), or region of interest end location information (e.g., end pitch and yaw), with respect to at least one region of interest. For example, the region of interest start location information may indicate a location of one edge of the region of interest, and the region of interest end location information may indicate a location of one edge of the region of interest, which is located at a diagonal location of a start location. For example, the region of interest may have a rectangular shape.

According to an embodiment, the event information may include at least one of an event identifier, an event time, or an event location (e.g., pitch and yaw), with respect to at least one event.

According to various embodiments, the processor 220 may determine a dead zone of a photographer based on a field of view of the photographer and may provide the photographer with a notification of a region of interest generated in the dead zone. According to an embodiment, the processor 220 may identify a photographer based on a specified gesture or a specified face. For example, the processor 220 may determine a dead zone of the photographer by determining a field of view of the photographer based on a gaze of the photographer. According to an embodiment, the processor 220 may identify an event generated in the dead zone and may provide a notification to the photographer when the specified condition is met. For example, the processor 220 may provide a notification to the photographer using an output device (not shown) of the electronic device 201 or via the external electronic device 301.

According to various embodiments, at least some of the above-mentioned operations of the electronic device 201 or the processor 220 may be performed by the external electronic device 301. For example, the processor 320 of the external electronic device 301 may stitch at least one image received from the electronic device 201 and may map the stitched image onto a projection layer of a specified form to generate image data. For example, the processor 320 may generate at least one region of interest from an image received from the electronic device 201 or an image stored in the memory 330 and may include information about the region of interest in metadata. For example, the processor 320 may determine a dead zone of the photographer based on a field of view of the photographer and may provide the photographer with a notification of a region of interest generated in the dead zone. For example, the processor 320 may identify an event generated in the dead zone and may provide the photographer with a notification when the specified condition is met.

According to various embodiments, the processor 220 may transmit image data and/or metadata to the external electronic device 301 over the network 398. According to an embodiment, the processor 220 may transmit image data and/or metadata to the server 308 via the external electronic device 301. According to another embodiment, the processor 220 may transmit image data and/or metadata to the server 308 over the network 399. For example, the processor 220 may transmit the obtained image to the external electronic device 301 or the server 308 in real time.

According to various embodiments, the electronic device 201 and the external electronic device 301 may operate in a state where they interwork with each other. According to an embodiment, the image obtained by the electronic device 201 may be displayed on the display device 360 of the external electronic device 301. For example, the external electronic device 301 may provide a view finder for identifying at least a portion of an image obtained through the camera module 280 of the electronic device 201 on the display device 360. According to an embodiment, the electronic device 201 may be controlled based on a signal from the external electronic device 301. For example, the external electronic device 301 may control the electronic device 201 by transmitting a user input received through the display device 360 or the like to the electronic device 201.

According to various embodiments, the electronic device 201 may transmit image data and/or metadata to the external electronic device 301 and/or the server 308, for example, in real time. According to an embodiment, the electronic device 201 may transmit image data and/or metadata to the external electronic device 301 and the server 308, According to an embodiment, the electronic device 201 may transmit image data and/or metadata to the external electronic device 301 and the external electronic device 301 may transmit the received image data and/or metadata to the server 308.

According to various embodiments, the processor 220 may be configured to obtain an omnidirectional image, identify at least one face from the omnidirectional image, obtain at least one gaze from the at least one face, and generate at least one region of interest of the omnidirectional image based at least on the at least one gaze.

According to an embodiment, the processor 220 may be configured to identify a first face from the omnidirectional image and generate a region of the omnidirectional image, which corresponds to a first gaze of the first face, as a first region of interest. For example, the first face may correspond to a face stored in the memory 230 or a face performing a specified gesture.

According to an embodiment, the processor 220 may be configured to generate the first face as a second region of interest. According to an embodiment, the processor 220 may be configured to move the first region of interest along movement of the first gaze. According to an embodiment, the processor 220 may be configured to set a direction corresponding to the first gaze to a default viewing direction.

According to an embodiment, the processor 220 may be configured to recognize a plurality of faces from the omnidirectional image, obtain a plurality of gazes from the plurality of faces, and generate a first region corresponding to a first direction as the first region of interest based on the number of at least one first gaze corresponding to the first direction among the plurality of gazes.

According to an embodiment, the processor 220 may be configured to, when the number of the at least one first gaze is greater than or equal to a specified number or when the first direction is a direction where the number of gazes corresponding to the same direction among the plurality of gazes is the largest, generate the first region as the first region of interest.

According to an embodiment, the processor 220 may be configured to, when the number of the plurality of recognized faces is greater than or equal to the number of specified faces, generate the first region as the first region of interest based on the number of the at least one first gaze.

According to an embodiment, the processor 220 may be configured to identify a face moving lips and generate a region of the omnidirectional image, which corresponds to a gaze of the face, as the at least one region of interest.

According to an embodiment, the processor 220 may be configured to obtain the at least one gaze based on a normal for a plane, which is composed of a center point between two eyes and a mouth of the at least one face.

According to an embodiment, the processor 220 may be configured to generate a region where the at least one gaze is oriented in a spherical space to which the omnidirectional image is mapped as the at least one region of interest.

According to an embodiment, the processor 220 may be configured to store information of the at least one generated region of interest in metadata of the omnidirectional image.

According to an embodiment, the electronic device 201 may further include a camera circuitry (e.g., the camera module 280) configured to obtain the omnidirectional image. The processor 220 may be configured to obtain the omnidirectional image using the camera circuitry 280.

According to an embodiment, the processor 220 may be configured to transmit the obtained omnidirectional image and information of the at least one generated region of interest to an external electronic device (e.g., the external electronic device 301 or the server 308) using the communication circuitry.

According to various embodiments, the processor 320 may be configured to obtain an omnidirectional image, identify at least one face from the omnidirectional image, obtain at least one gaze from the at least one face, and generate at least one region of interest of the omnidirectional image based at least on the at least one gaze.

According to an embodiment, the processor 320 may be configured to identify a first face from the omnidirectional image and generate a region of the omnidirectional image, which corresponds to a first gaze of the first face, as a first region of interest. For example, the first face may correspond to a face stored in the memory 330 or a face performing a specified gesture.

According to an embodiment, the processor 320 may be configured to generate the first face as a second region of interest. According to an embodiment, the processor 320 may be configured to move the first region of interest along movement of the first gaze. According to an embodiment, the processor 320 may be configured to set a direction corresponding to the first gaze to a default viewing direction.

According to an embodiment, the processor 320 may be configured to recognize a plurality of faces from the omnidirectional image, obtain a plurality of gazes from the plurality of faces, and generate a first region corresponding to a first direction as the first region of interest based on the number of at least one first gaze corresponding to the first direction among the plurality of gazes.

According to an embodiment, the processor 320 may be configured to, when the number of the at least one first gaze is greater than or equal to a specified number or when the first direction is a direction where the number of gazes corresponding to the same direction among the plurality of gazes is the largest, generate the first region as the first region of interest.

According to an embodiment, the processor 320 may be configured to, when the number of the plurality of recognized faces is greater than or equal to the number of specified faces, generate the first region as the first region of interest based on the number of the at least one first gaze.

According to an embodiment, the processor 320 may be configured to identify a face moving lips and generate a region of the omnidirectional image, which corresponds to a gaze of the face, as at least one region of interest.

According to an embodiment, the processor 320 may be configured to obtain the at least one gaze based on a normal for a plane, which is composed of a center point between two eyes and a mouth of the at least one face.

According to an embodiment, the processor 320 may be configured to generate a region where the at least one gaze is oriented in a spherical space to which the omnidirectional image is mapped as the at least one region of interest.

According to an embodiment, the processor 320 may be configured to store information of the at least one generated region of interest in metadata of the omnidirectional image.

According to an embodiment, the processor 320 may be configured to transmit the omnidirectional image and information of the at least one generated region of interest to an external electronic device (e.g., the server 308) using the communication circuitry 390.

According to an embodiment, the processor 320 may be configured to obtain the omnidirectional image from the memory 330 or from an external electronic device (e.g., the electronic device 201 or the server 308) using the communication circuitry 390.

Figure 4:
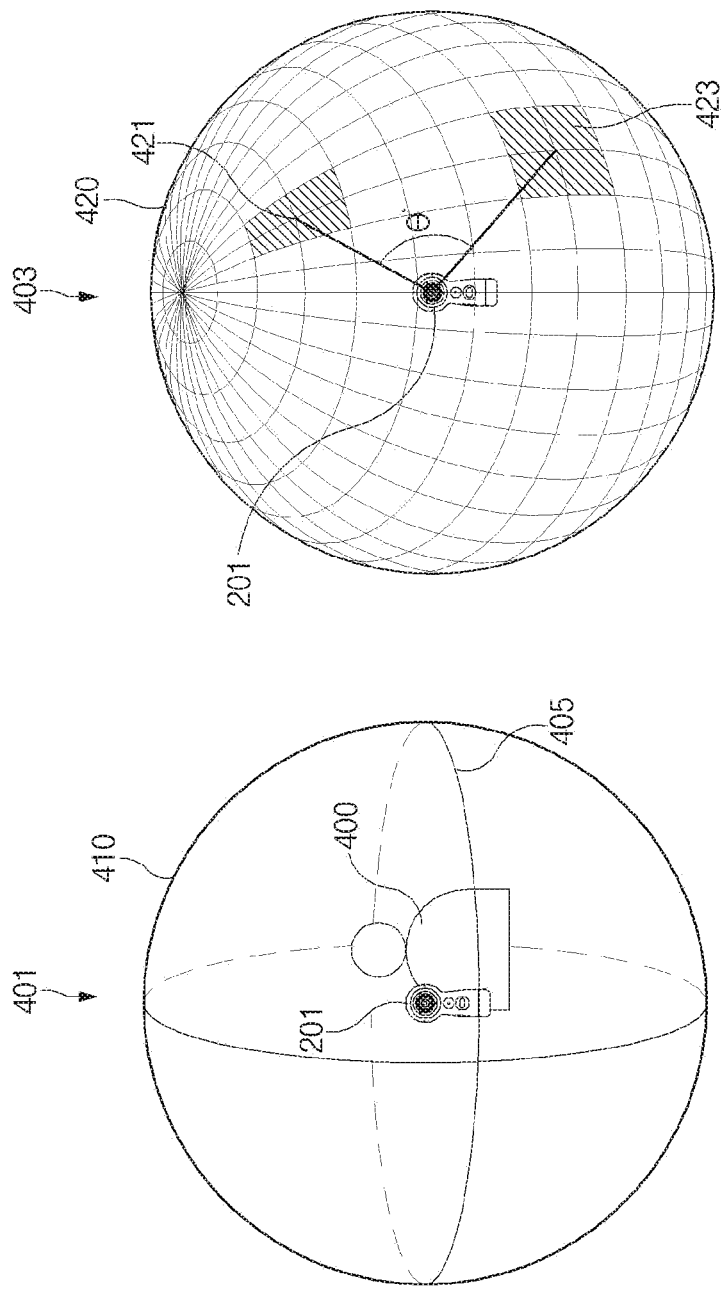
FIG. 4 illustrates an environment for omnidirectional image capture of an electronic device according to various embodiments.

FIG. 4 illustrates an environment for omnidirectional image capture of an electronic device according to various embodiments.

Referring to reference numeral 401, according to various embodiments, a processor 220 of an electronic device 201 may capture an omnidirectional image by means of a camera module 280. For example, it may be assumed that the electronic device 201 is located on a center point of a first plane 405 of a spherical space 410. For example, the processor 220 may obtain an omnidirectional image by means of the camera module 280 based on an input received from a user 400. According to an embodiment, the processor 220 may obtain at least one image corresponding to a specified shape. For example, the processor 220 may obtain at least one image corresponding to the spherical space 410. According to an embodiment, various types of images may be obtained according to the number of cameras of the electronic device 201, a form factor of the camera, and settings of a lens (e.g., the number of lenses, an image capture angle, lens coverage, and the like).

Referring to reference numeral 403, according to various embodiments, the processor 220 may generate an omnidirectional image from the at least one obtained image. According to an embodiment, the processor 220 may stitch the at least one obtained image (e.g., a still image or a video frame). For example, the processor 220 may perform stitching depending on a specified method or based on an input of the user 400. For example, the processor 220 may use a different stitching method depending on a configuration of the camera of the electronic device 201 (e.g., the number of cameras, a form factor of the camera, settings of a lens, and/or the like). According to an embodiment, the processor 220 may generate an omnidirectional image by mapping the stitched image onto a projection layer 420.

According to various embodiments, the processor 220 may extract a two-dimensional patch image from the omnidirectional image. For example, the processor 220 may extract a two-dimensional patch image from an omnidirectional image corresponding to a first region 421 of the omnidirectional image mapped to the projection layer 420. For example, the processor 220 may extract a two-dimensional patch image from an omnidirectional image corresponding to a second region 423 of the omnidirectional image mapped to the projection layer 420. According to an embodiment, the processor 220 may reduce image distortion capable of being generated in the patch image by extracting the two-dimensional patch image from a viewing center. For example, the image mapped to the first region 421 may have higher distortion than an image mapped to the second region 423 (e.g., the region corresponding to the viewing center). For example, the processor 220 may map the omnidirectional image mapped to the first region 421 to a location of the second region 423 by rotating the omnidirectional image mapped to the first region 421 by θ on the projection layer 420. The processor 220 may reduce a distortion of the patch image by extracting the two-dimensional patch image from the second region 423.

According to various embodiments, the operations of the electronic device 201 and the processor 220, which are described above in conjunction with reference numeral 403, may be performed by an external electronic device (not shown)(e.g., an external electronic device 301 of FIG. 3) interworking with the electronic device 201.

Figure 5:
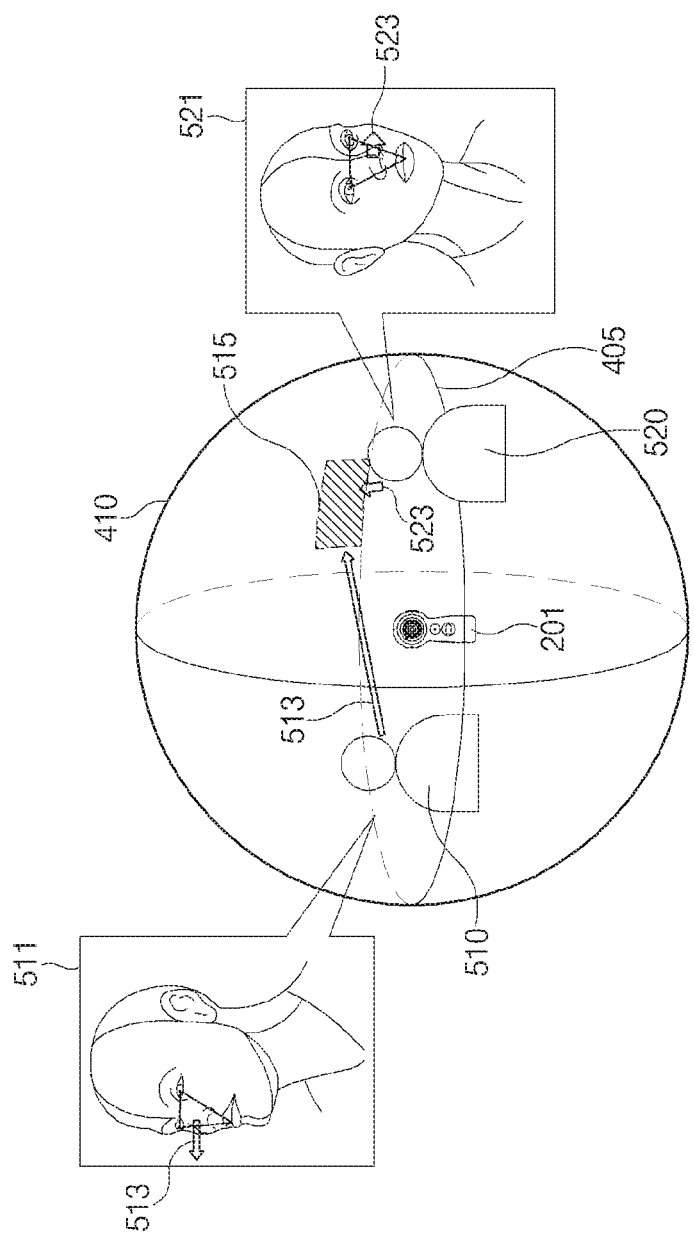
FIG. 5 illustrates an environment for region of interest detection of an electronic device according to various embodiments.

FIG. 5 illustrates an environment for region of interest detection of an electronic device according to various embodiments.

According to various embodiments, an electronic device 201 may identify at least one face from an omnidirectional image (e.g., a still image, a 1 sample of a moving image, or a 1 frame of the moving image). For example, the electronic device 201 may identify a first face 511 of a first person 510 and a second face 521 of a second person 520. According to an embodiment, the electronic device 201 may stitch a plurality of obtained images, may map the stitched image onto a projection layer (e.g., a spherical mesh) to generate an omnidirectional image, and may identify a face from the generated omnidirectional image. According to an embodiment, the electronic device 201 may identify a face from a plurality images before being stitched or the stitched image before being mapped to the projection layer.

According to various embodiments, a processor 220 of the electronic device 201 may perform face detection and/or face recognition from the omnidirectional image. According to an embodiment, the processor 220 may perform face detection and/or face recognition from the omnidirectional image or a 2D patch image of the omnidirectional image. According to an embodiment, the processor 220 may detect a face by recognizing a specific region located on the face (e.g., an eye region, a lip region, a nose region, and/or an ear region). According to an embodiment, the processor 220 may extract a feature point composed of a plurality of vector values from the detected face and may perform face recognition from the feature point. According to an embodiment, the processor 220 may store information about the detected or recognized face in a memory 230 or may transmit the information about the detected or recognized face to an external electronic device (not shown) (e.g., an external electronic device 301 of FIG. 3). For example, the information about the face may include a size of the face, a location of the face, a singularity value of the face, a face identifier, and/or frame information where the face is located. According to an embodiment, the processor 220 may 1) extract a 2D patch image from one region of the omnidirectional image, 2) may perform face detection and recognition, and 3) may store information about a face. For example, while repeating operations 1) to 3) while rotating the omnidirectional image, the processor 220 may perform face detection and recognition for the entire region of the omnidirectional image.

According to various embodiments, the processor 220 may set the recognized face to a region of interest. For example, the processor 220 may set the recognized first face 511 and the recognized second face 521 to regions of interest. For example, the processor 220 may store information about locations of at least two edges of the region of interest in metadata of the omnidirectional image.

According to various embodiments, the processor 220 may obtain a gaze from the recognized face. According to an embodiment, the processor 220 may identify a gaze based on locations of eyes and a mouth of the face. For example, the processor 220 may obtain a first gaze 513 from a normal 512 for a plane, on which a center point between two eyes and a mouth of the first face 511 is formed. For example, the processor 220 may obtain a second gaze 523 from the normal 522 for a plane, on which a center point between two eyes and a mouth of the second face 521 is formed. According to an embodiment, the processor 220 may identify a gaze from only a valid face capable of obtaining the gaze (e.g., a face on which two eyes and a mouth may be identified).

According to various embodiments, the processor 220 may generate at least one region of interest based on at least one gaze. According to an embodiment, the processor 220 may generate a region, where at least one gaze is oriented on a spherical space 410, as a region of interest. For example, the processor 220 may generate a first region 515 corresponding to the first gaze 513 and/or the second gaze 523 as a region of interest. According to an embodiment, the processor 220 may determine a location of the first region 515 before mapping to a projection layer. For example, the processor 220 may determine an angle difference between a normal of a face region image (e.g., the first face 511) before mapping to the projection layer and a gaze (e.g., the gaze 513) of the face and may obtain coordinates (e.g., yaw and pitch) of the first region 515 based on the angle difference and magnification when mapping the face region image to the projection layer.

According to an embodiment, the processor 220 may store information about locations of at least two edges of the first region 515 in metadata of the omnidirectional image.

According to various embodiments, the processor 220 may generate a region of interest based on a gaze which is maintained over a specified time. According to an embodiment, the processor 220 may generate a region of interest based on the gaze only when the identified gaze is maintained on substantially the same region (e.g., the same region or a region of less than a specified distance within the spherical space 410) over a predetermined time (e.g., a specified number of frames). According to an embodiment, the processor 220 may generate a region of interest based on the corresponding gaze when a change in the identified gaze direction is within a specified range during a predetermined time (e.g., a specified number of frames).

According to various embodiments, the above-mentioned operations of the processor 220 may be performed by the external electronic device (not shown) (e.g., the external electronic device 301 of FIG. 3). For example, the external electronic device 301 may generate a region of interest based on a gaze depending on the above-mentioned methods. According to an embodiment, the electronic device 201 may obtain and transmit a gaze for the detected and/or recognized face to the external electronic device 301. For example, the external electronic device 301 may generate a region of interest, depending on the above-mentioned embodiments, based on the received gaze information.

Figure 6:
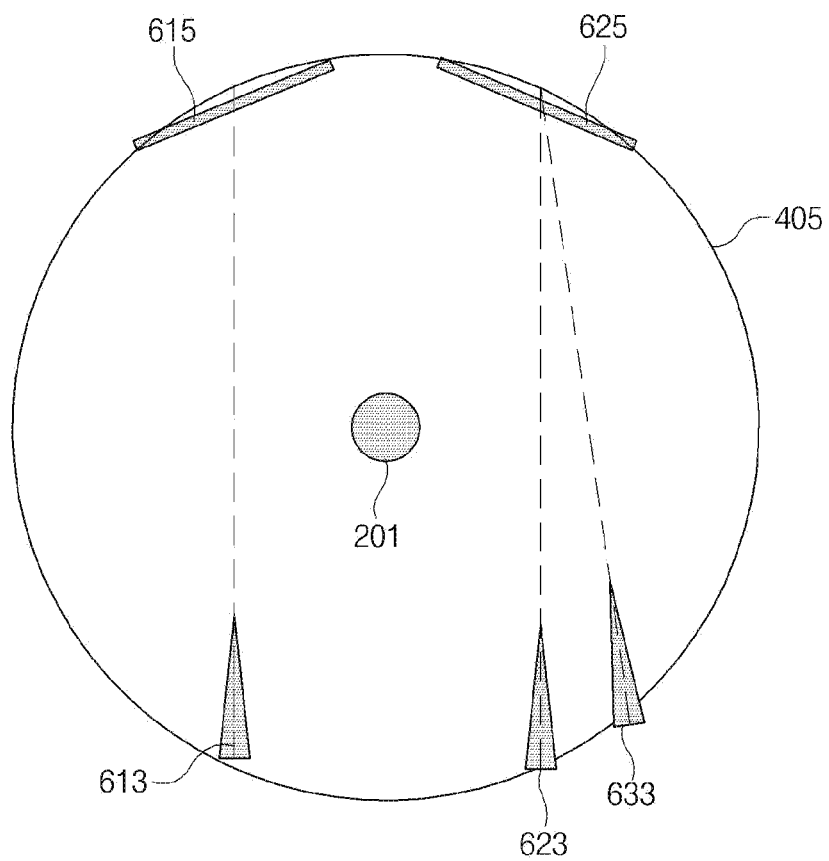
FIG. 6 illustrates an example of detecting a region of interest based on a plurality of gazes in an electronic device according to various embodiments.

FIG. 6 illustrates an example of detecting a region of interest based on a plurality of gazes in an electronic device according to various embodiments.

According to various embodiments, a processor 220 of an electronic device 201 may detect a plurality of gazes from an omnidirectional image of a captured spherical space (e.g., a spherical space 410 of FIG. 4) and may set at least one region of interest based on the plurality of gazes. According to an embodiment, the processor 220 may set a region of interest based on the number of gazes associated with the same region. For example, the processor 220 may set a region, where the number of gazes associated with the same region is the largest, and/or a region, where the number of gazes associated with the same region is greater than or equal to a specified number, to a region of interest. According to an embodiment, the processor 220 may set a region of interest and/or a recommended viewing direction based on the number of gazes only when the number of obtained faces or the number of gazes is greater than or equal to a specified number. In FIG. 6, a first surface 405 may refer to a layer obtained by cutting a spherical layer corresponding to a spherical space 410 along the first surface 405. Hereinafter, for convenience of description, the first surface 405 may be referred to as the spherical layer 405.

According to an embodiment, the processor 220 may detect a first gaze 613, a second gaze 623, and a third gaze 633 on the spherical layer 405. For example, the first gaze 615 may be oriented towards a first region 615, and the second gaze 623 and the third gaze 633 may be oriented towards a second region 625. According to an embodiment, the processor 220 may generate the second region 625 towards which a largest number of the gazes 623 and 633 are oriented among the plurality of gazes 613, 623, and 633 as a region of interest.

According to an embodiment, the processor 220 may set a recommended viewing direction or a default viewing screen based on the number of gazes for the same region. For example, the processor 220 may count the number of gazes corresponding to each region on the spherical layer 405. For example, the processor 220 may count a count for the first region 615 to 1 and may count a count for the second region 625 to 2. According to an embodiment, the processor 220 may set the second region 625 with the highest count to a recommended viewing direction or a default viewing screen. For example, the processor 220 may store information about the recommended viewing direction or the default viewing screen in metadata.

According to an embodiment, the processor 220 may register all regions corresponding to gazes as regions of interest and may determine priorities for the regions of interest. For example, the processor 220 may set the first region 615 and the second region 625 corresponding to the gazes 613, 623, and 633 to regions of interest and may set a priority for each region based on the number of gazes. For example, the processor 220 may set a higher priority for a corresponding region of interest as the number of corresponding gazes is higher. For example, the priority of the second region 625 may be higher than the priority of the first region 615. For example, the processor 220 may set a region of interest (e.g., the second region 625) with the highest priority to a recommended viewing direction or a default viewing screen and may set the other regions of interest (e.g., the first region 625) to candidate output locations depending on priorities.

According to an embodiment, the processor 220 may store additional information about the region of interest in metadata. For example, the additional information may include at least one of a title, a technical name, a location, or a description of an object corresponding to the region of interest. For example, the additional information may be obtained by at least one of a web search for the identified object, a user input for a region of interest corresponding to the identified object, or a web search based on a user input.

According to various embodiments, an external electronic device (not shown)(e.g., an external electronic device 301 of FIG. 3) may display an omnidirectional image on a display device 360 based on priorities of regions of interest or may provide a screen change based on a user input. For example, the external electronic device 301 may output a region of interest with a high priority as a default viewing screen on the display device 360. For example, the external electronic device 301 may change a screen to a region of interest with a low priority based on a user input. For example, the electronic device 301 may perform a screen change in a descending order of priorities. For example, the external electronic device 301 may output a region of interest with a high priority on the display device 360 at a higher magnification. For example, the external electronic device 301 may zoom in on a region of interest with a high priority to output the region of interest on the display device 360. According to an embodiment, the external electronic device 301 may output a region corresponding to one of the set regions of interest as a default viewing region on the display device 360. According to an embodiment, the external electronic device 301 may output information of at least one of the other regions of interest, which are not currently displayed on the default viewing region, on the display device 360. For example, the external electronic device 301 may output information of at least one of the other regions of interest on the display device 360 based at least on a distance from the viewing region and/or a priority of a region of interest.

According to an embodiment, the processor 220 may set a region of interest, a recommended viewing direction, and/or a default viewing region based on a speaker. For example, the processor 220 may identify the speaker by detecting motion of a mouth of the face identified from the omnidirectional image. For example, the first gaze 613 may be a gaze of the speaker. According to an embodiment, the processor 220 may set the first region 615 corresponding to the gaze (the first gaze 613) of the speaker to a region of interest and/or a default viewing region or may set the direction of the first region 615 to a recommended viewing direction. According to an embodiment, the processor 220 may set a region of interest, a recommended viewing direction, and/or a default viewing region based on the gaze of the speaker only when the number of faces detected from the omnidirectional image is a specified number (e.g., 2). According to an embodiment, when a plurality of speakers are detected, the processor 220 may maintain the recommended viewing direction and/or the default viewing region along a gaze of the speaker who first starts utterance or may change the recommended viewing direction and/or the default viewing region along a gaze of the speaker who starts utterance later.

According to various embodiments, the above-mentioned operations of the processor 220 may be performed by the external electronic device (not shown) (e.g., the external electronic device 301 of FIG. 3). For example, the external electronic device 301 may generate regions of interest and priorities based on the number of gazes depending on the above-mentioned methods. For example, as described above, the external electronic device 301 may generate a region of interest, a recommended viewing direction, and/or a default viewing region based on a gaze of a speaker.

Figure 7:
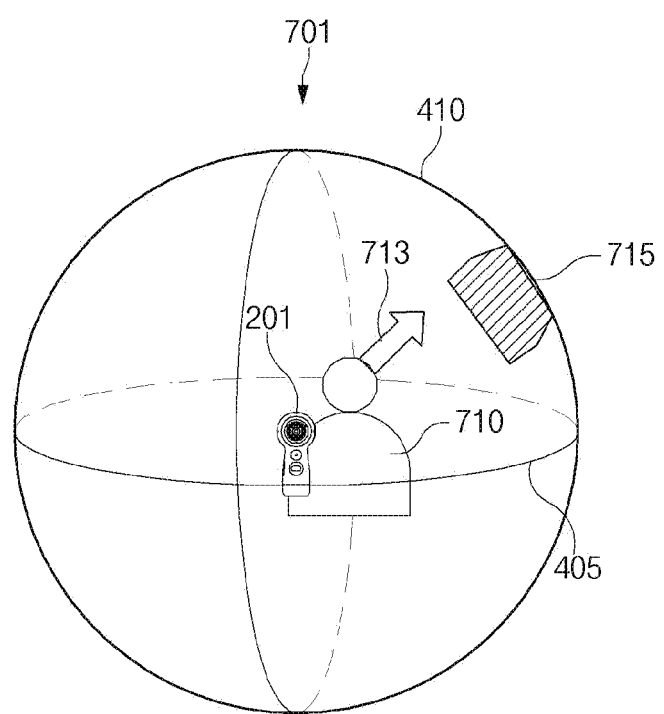
FIG. 7 illustrates an example of detecting a region of interest based on a photographer's gaze in an electronic device according to various embodiments.

FIG. 7 illustrates an example of detecting a region of interest based on a photographer's gaze in an electronic device according to various embodiments.

Referring to an image capture environment 701 of FIG. 7, according to various embodiments, a processor 220 of an electronic device 201 may set a region of interest 715 based at least on a gaze 713 of a photographer 710. According to an embodiment, the processor 220 may set a region of interest corresponding to the gaze 713 of the photographer 710 to a recommended viewing direction or a default viewing region.

According to an embodiment, the processor 220 may identify a face of the photographer 710 by comparing face information stored in a memory 230, face information received from an external electronic device (not shown) (e.g., an external electronic device 301 or a server 308 of FIG. 3), and a face detected from an omnidirectional image. For example, the processor 220 may identify the same face as the face of the specified photographer 710 from the omnidirectional image using a similar image search, feature point search, and/or a face image search method.

According to an embodiment, the processor 220 may identify the face of the photographer 710 based on a specified gesture. For example, the processor 220 may identify a face having a specific look (e.g., a face winking over a specified time) as the face of the photographer 710. For example, the processor 220 may identify a face of a person who waves his or her hand as the face of the photographer 710. According to various embodiments, the processor 220 may identify the photographer 710 based on a face of a person, each body part (e.g., a hand holding an electronic device, an arm, or the like), and/or a gesture the entire body.

According to an embodiment, the processor 220 may identify the face of the photographer 710 based on a frequency of detection, a detection time, and/or a size. For example, the processor 220 may identify a face with the highest frequency of detection as the face of the photographer 710. For example, the processor 220 may identify a face with the longest detection time as the face of the photographer 710. For example, the processor 220 may identify a face with the largest face area as the face of the photographer 710. According to an embodiment, the processor 220 may identify the face of the photographer 710 based on a face identified by a rear camera 283. For example, the processor 220 may identify a face meeting at least one of the above-mentioned conditions among faces obtained by the rear camera 283 as the face of the photographer 710.

According to various embodiments, an omnidirectional image may be streamed in real time by the electronic device 101. According to various embodiments, the external electronic device 301 may receive a real-time image from the electronic device 201 or the server 308 and may display a recommended viewing direction or a default viewing region corresponding to a gaze 713 of the photographer 710 or a region of interest 715 on the display 360. As an image is provided according to the same gaze as the gaze 713 of the photographer 710, immersion of a viewer of the omnidirectional image may be increased.

According to various embodiments, at least some of the above-mentioned operations of the electronic device 201 or the processor 220 may be performed by the external electronic device 301. For example, the external electronic device 301 may identify the photographer 710 from the omnidirectional image received from the electronic device 201 or the server 308 via the communication circuitry 390 and may set the region of interest 715, a recommended viewing direction, and/or a default viewing region based on the gaze 713 of the photographer 710. According to an embodiment, the external electronic device 301 may display a portion of the omnidirectional image on the display device 360 depending on the region of interest 715, the recommended viewing direction, and/or the default viewing region. According to an embodiment, the external electronic device 301 may transmit information about the region of interest 715, the recommended viewing direction, and/or the default viewing region together with the omnidirectional image to the server 308.

Figure 8:
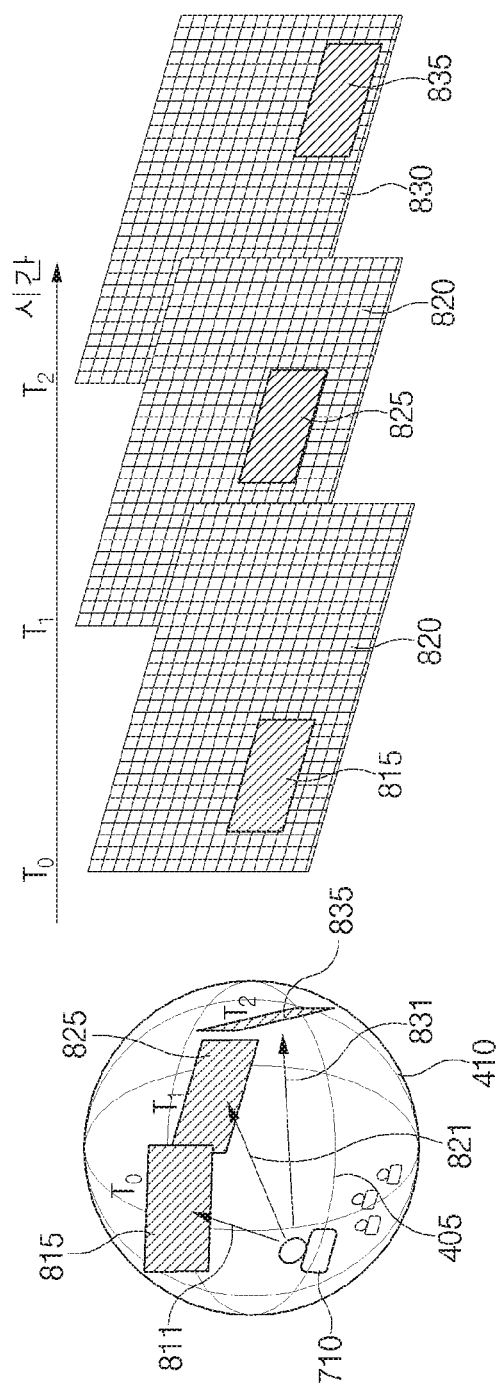
FIG. 8 illustrates an example of a method for setting a dynamic region of interest in an electronic device according to various embodiments.

FIG. 8 illustrates an example of a method for setting a dynamic region of interest in an electronic device according to various embodiments.

Referring to FIG. 8, according to various embodiments, an electronic device (e.g., an electronic device 201 of FIG. 3) may move a region of interest based on movement of a gaze of a photographer 710. According to an embodiment, while time passes in an order of T0, T1, and T2, a gaze of the user 710 may move in an order of a first gaze 811, a second gaze 821, and a third gaze 831. According to an embodiment, the processor 220 may move a region of interest in an order of a first region of interest 815, a second region of interest 825, and a third region of interest 835, in response to the movement of the gaze.

According to an embodiment, the processor 220 may set the regions of interest 815, 825, and 835 based on a region on a mesh layer 820 corresponding to a spherical space 410. For example, the mesh layer 820 shown in FIG. 8 may be to unfold a spherical layer on a plane.

According to an embodiment, the processor 220 may set the first region of interest 815, the second region of interest 825, and the third region of interest 835 to a default viewing region or a recommended viewing direction in each frame. For example, a viewer who views an omnidirectional image by means of an external electronic device (not shown) (e.g., an external electronic device 301 of FIG. 3) may view an omnidirectional image, a viewing region of which is moved along movement of a default viewing region or a recommended viewing direction.

According to various embodiments, at least some of the above-mentioned operations of the electronic device 201 or the processor 220 may be performed by the external electronic device 301. For example, the external electronic device 301 may set a region of interest, a recommended viewing direction, and/or a default viewing region based on movement of the gaze of the photographer 710.

Figure 9:
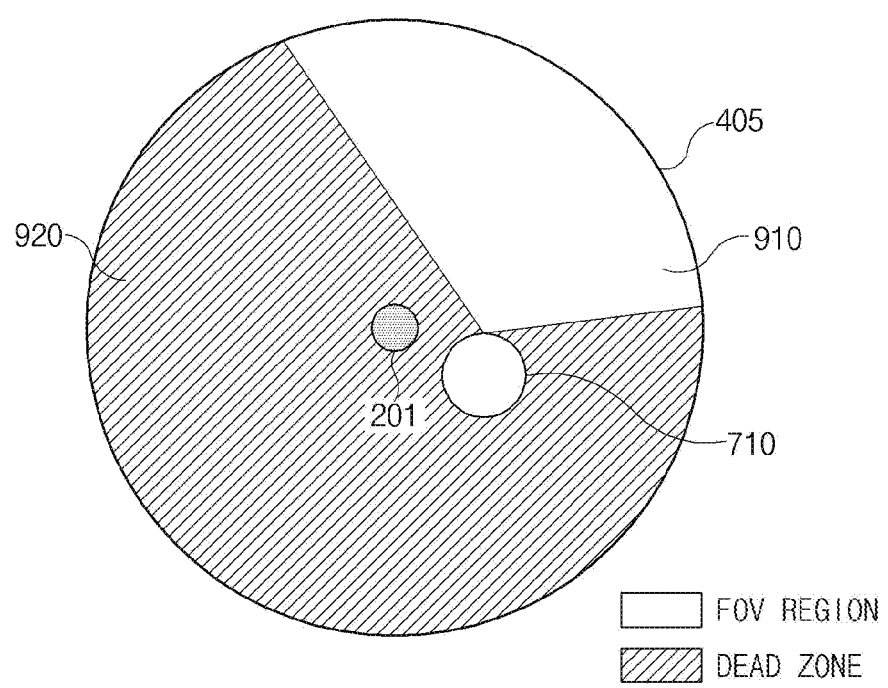
FIG. 9 is a drawing illustrating a method for providing an alarm according to various embodiments.

FIG. 9 is a drawing illustrating a method for providing an alarm according to various embodiments.

According to various embodiments, a processor 220 of an electronic device 201 may provide a photographer 710 with a notification of a region of interest. For example, the processor 220 may provide a notification via an output means of the electronic device 201, an output means of an external electronic device (not shown) (e.g., an external electronic device 301 of FIG. 3), or a separate output means (e.g., a wearable device, an earbud, a wireless headset, and/or the like) interworking with the external electronic device 301. For example, the notification may include a sound, vibration, and/or an image.

According to various embodiments, the processor 220 may receive information of interest from the external electronic device 301 or a server (e.g., a server 308 of FIG. 3). According to an embodiment, the processor 220 may obtain information of interest from a memory 230. For example, the information of interest may refer to information in which the photographer 710 may be interested. For example, the information of interest may include a specified voice, a specified image, and/or a specified text. For example, the information of interest may include information about a specific place (e.g., a local name, a tourist attraction, a name, and/or a brand name). For example, the information of interest may include a sound of more than a specified level, a sound corresponding to a frequency of a specified range, and/or a sound of a specified tone.

According to an embodiment, the processor 220 may obtain information of interest before image capture starts or while image capture is performed.

According to an embodiment, the processor 220 may detect at least one region of interest based at least on the information of interest from an omnidirectional image. For example, the processor 220 may identify at least one object based on an object identification technology. For example, the processor 220 may classify the identified object depending on a plurality of classifications (e.g., a person, an animal, a background, and/or a thing) and may divide an object which belongs to a specified classification from the omnidirectional image. For example, the processor 220 may compartmentalize an object from the omnidirectional image to divide the corresponding object from the omnidirectional image. According to an embodiment, the processor 220 may store information obtained from an image of the compartmentalized object as metadata.

According to an embodiment, the processor 220 may set a region of interest based on voice data received from a microphone of the electronic device 201. For example, the processor 220 may convert voice data into text data to determine whether the voice data corresponds to information of interest.

According to an embodiment, the processor 220 may obtain location information, movement information, and time information of the electronic device 201. For example, the processor 220 may obtain the location information, the movement information, and/or the time information of the electronic device 201 using a sensor module 176 (e.g., a global positioning system (GPS) and/or a gyroscope) of the electronic device 201.

According to an embodiment, the processor 220 may detect a region of interest with respect to the entire region of a spherical layer 405 or a dead zone 920 except for a field of view region 910 of the photographer 710 in the entire region. For example, the processor 220 may detect a region of interest by detecting an object corresponding to information of interest.

According to an embodiment, the processor 220 may provide a notification of a region of interest based on a specified condition. For example, when the region of interest is detected from the dead zone 920, the processor 220 may provide a notification of the region of interest. For example, the processor 220 may determine whether to provide a notification based on a preference (e.g., a user preference) of an object associated with the region of interest, proximity (e.g., a distance between the photographer 710 or the electronic device 201 and an object), continuity (e.g., a detected time or a time which is not detected), positivity (e.g., a negative object associated with safety), and/or popularity (e.g., awareness (e.g., awareness based on big data or the like)). For example, when the object has a high priority or preference, when the object is located less than a specified distance, when the object is detected over a specified time, when the object is a dangerous target, or when the object has awareness of a specified range or more, the processor 220 may provide a notification.

According to various embodiments, at least a portion of the above-mentioned method for providing the notification may be performed by the external electronic device 301. According to an embodiment, the external electronic device 301 may provide a user interface for inputting information of interest using a display device 360. According to an embodiment, the external electronic device 301 may extract a region of interest based on data (e.g., an omnidirectional image or the like) received from the electronic device 201 and may provide a notification of the region of interest. According to an embodiment, the external electronic device 301 may provide a notification of the region of interest based on data received from the electronic device 201.

According to various embodiments, the electronic device 201 and/or the external electronic device 301 may provide a different type (e.g., an audio, an image, an image, or the like) of notification based on a type (e.g., a positive object or a negative object) of the region of interest.

According to various embodiments, the external electronic device 301 may provide information associated with the region of interest together with the notification. For example, the external electronic device 301 may provide information associated with the region of interest by searching (e.g., a web search or the like) for information about an identified object. For example, the external electronic device 301 may provide information about the region of interest in the form of a voice and/or an image.

According to various embodiments, the electronic device 201 and/or the external electronic device 301 may provide a notification through vibration. According to an embodiment, a notification may be provided through the electronic device 201 with respect to a first type of object. According to an embodiment, a notification may be provided through the external electronic device 301 with respect to a second type of object.

According to various embodiments, the external electronic device 301 may display an indicator corresponding to the region of interest on the display device 360. For example, the external electronic device 301 may display the indicator corresponding to the region of interest as a pop-up image on a real-time image received from the electronic device 201. According to an embodiment, the indicator may indicate a direction of the region of interest or may include a guide for a direction change to the region of interest. According to an embodiment, the external electronic device 301 may display an image (e.g., a zoomed-out image) corresponding to the region of interest as a pop-up image on a real-time image received from the electronic device 201.

Figure 10:
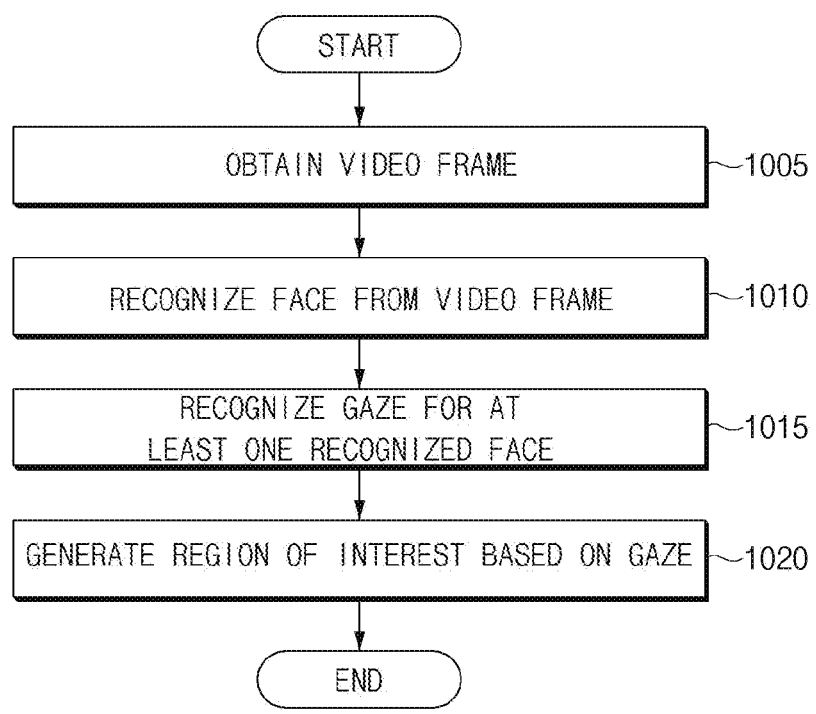
FIG. 10 is a flowchart of a method for setting a region of interest according to various embodiments.

FIG. 10 is a flowchart of a method for setting a region of interest according to various embodiments.

Referring to operation 1005, according to various embodiments, a processor (e.g., a processor 220 or a processor 320) of an electronic device (e.g., an electronic device 201 or an external electronic device 301 of FIG. 3) may obtain a video frame (e.g., an omnidirectional image). For example, the electronic device 201 may obtain the video frame using a camera module 280. For example, the external electronic device 301 may obtain the video frame from the electronic device 201 or a server 308.

Referring to operation 1010, according to various embodiments, the processor may recognize a face from the video frame. According to an embodiment, the processor may recognize a face based on a face stored in a memory or based on at least a partial region (e.g., eyes, a noise, a mouth, or the like) of the face.

Referring to operation 1015, according to various embodiments, the processor may recognize a gaze for the at least one recognized face. According to an embodiment, the processor may recognize a gaze for the face by obtaining a normal corresponding to one plane of the recognized face.

Referring to operation 1020, according to various embodiments, the processor may generate a region of interest based on the recognized gaze. According to an embodiment, the processor may generate one region of the video frame corresponding to the gaze as the region of interest. According to an embodiment, the processor may set the region of interest to a default viewing region or may set a recommended viewing direction based on the region of interest. For example, the recognized gaze may correspond to a gaze of a photographer. According to an embodiment, the processor may store region of interest information in metadata.

Figure 11:
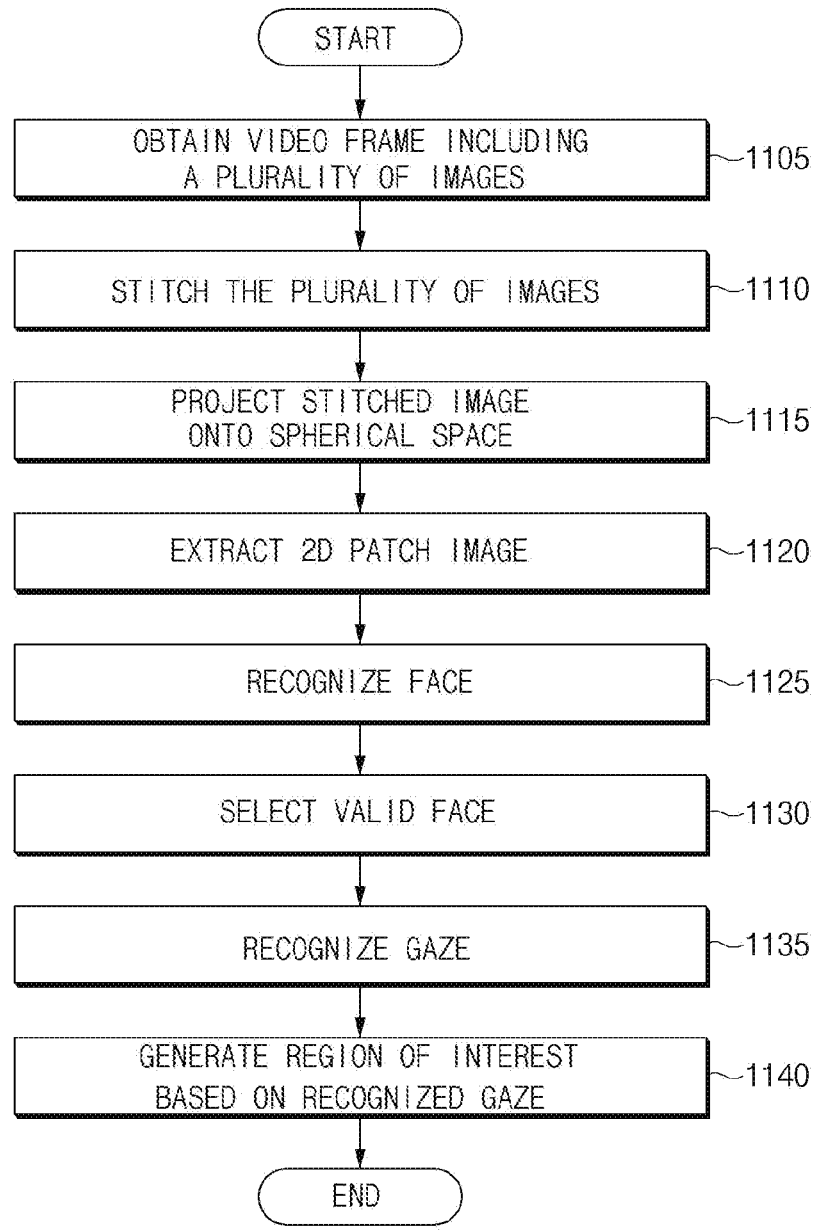
FIG. 11 is a flowchart of a method for generating a region of interest according to various embodiments.

FIG. 11 is a flowchart of a method for generating a region of interest according to various embodiments.

Hereinafter, the method for generating the region of interest in FIG. 11 will be described with respect to an external electronic device 301 of FIG. 3. However, as described above in conjunction with various embodiments, at least some of operations of the external electronic device 301, which will be described below, may be performed by an electronic device 201 of FIG. 3.

In operation 1105, according to various embodiments, a processor 320 may obtain a video frame including a plurality of images. For example, the processor 320 may obtain the video frame including the plurality of images from a server 308 or an electronic device 201 via a communication circuitry 390.

In operation 1110, according to various embodiments, the processor 320 may stitch the plurality of images into an image for being projected onto a spherical space. For example, the processor 320 may use a different stitching method depending to a setting of a projection space.

In operation 1115, according to various embodiments, the processor 320 may project the stitched image onto the spherical space. The spherical space is illustrative, and the projection space is not limited to the spherical shape.

In operation 1120, according to various embodiments, the processor 320 may extract a 2D patch image with respect to at least a partial region of the projected image. For example, the processor 320 may extract a 2D patch image with reduced distortion by extracting the 2D patch image while rotating the projection space.

In operation 1125, according to various embodiments, the processor 320 may perform face recognition from the 2D patch image. For example, the processor 320 may perform face recognition based on at least a partial region of the face and/or a face stored in a memory 330. According to an embodiment, the processor 320 may store information about the recognized face (e.g., a face image, a face feature point, a face size, a face identifier, and/or the like) in the memory 330 or the server 308.

According to an embodiment, operations 1115, 1120, and 1125 may be repeatedly performed while rotating the spherical space until face image recognition is performed for the entire region or a partial region (e.g., a specified region) of the projected image. According to an embodiment, the processor 320 may repeatedly perform operations 1115 and 1120 to extract a plurality of 2D patch images for the entire region or a partial region and may perform face recognition with respect to the plurality of 2D patch images.

In operation 1130, according to various embodiments, the processor 320 may select a valid face among the recognized faces. According to an embodiment, the processor 320 may determine a face capable of recognizing a gaze from the face as the valid face. For example, the valid face may include a face on which at least two eyes and a mouth may be identified.

In operation 1135, according to various embodiments, the processor 320 may perform gaze recognition with respect to the valid face. For example, the processor 320 may recognize a normal for a plane, where two eyes and a mouth of the valid face are edges, as a gaze. According to an embodiment, when the valid face is plural in number, the processor 320 may perform gaze recognition for each face.

In operation 1140, according to various embodiments, the processor 320 may generate a region of interest based on the at least one or more recognized gazes. According to an embodiment, the processor 320 may set a region of the spherical space, where the recognized gaze is oriented, to the region of interest. According to an embodiment, when the recognized gaze is plural in number, the processor 320 may set a region of interest and a candidate region of interest based on priorities (e.g., the number of gazes or the like). According to an embodiment, the processor 320 may store information about the region of interest in metadata.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments asset forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication circuitry;
a memory; and
a processor operatively connected to the communication circuitry and the memory, wherein the processor is configured to:
obtain an omnidirectional image;
identify at least one face from the omnidirectional image;
obtain at least one gaze from the at least one face; and
generate at least one second region of interest of the omnidirectional image based at least on the at least one gaze, wherein the at least one second region of interest corresponds to a region where the at least one gaze is oriented in a spherical space onto which the omnidirectional image is mapped.

2. The electronic device of claim 1, wherein the processor is configured to identify a first face from the omnidirectional image and generate a region of the omnidirectional image, the region corresponding to a first gaze of the first face, as the second region of interest, and
wherein the first face is a face stored in the memory or a face performing a specified gesture.

3. The electronic device of claim 2, wherein the processor is configured to generate the first face as a first interest of region.

4. The electronic device of claim 2, wherein the processor is configured to move the second interest of region along movement of the first gaze.

5. The electronic device of claim 2, wherein the processor is configured to set a direction corresponding to the first gaze to a default viewing direction.

6. The electronic device of claim 1, wherein the processor is configured to:
recognize a plurality of faces from the omnidirectional image;
obtain a plurality of gazes from the plurality of faces; and
generate a first region corresponding to a first direction as the second region of interest based on the number of at least one first gaze corresponding to the first direction among the plurality of gazes.

7. The electronic device of claim 6, wherein the processor is configured to:
when the number of the at least one first gaze is greater than or equal to a specified number or when the first direction is a direction where the number of gazes corresponding to the same direction among the plurality of gazes is the largest, generate the first region as the second region of interest.

8. The electronic device of claim 6, wherein the processor is configured to:
when the number of the plurality of recognized faces is greater than or equal to the number of specified faces, generate the first region as the second region of interest based on the number of the at least one first gaze.

9. The electronic device of claim 1, wherein the processor is configured to:
identify the at least one face by identifying a face with moving lips.

10. The electronic device of claim 1, wherein the processor is configured to obtain the at least one gaze based on a normal for a plane, the normal being composed of a center point between two eyes and a mouth of the at least one face.

11. The electronic device of claim 1, wherein the processor is configured to store information of the at least one generated second region of interest in metadata of the omnidirectional image.

12. The electronic device of claim 1, further comprising:
a camera circuitry configured to obtain the omnidirectional image,
wherein the processor is configured to obtain the omnidirectional image using the camera circuitry.

13. The electronic device of claim 12, wherein the processor is configured to transmit the obtained omnidirectional image and information of the at least one generated second region of interest to an external electronic device using the communication circuitry.

14. A method for generating a region of interest, the method comprising:
obtaining an omnidirectional image;
identifying at least one face from the omnidirectional image;
obtaining at least one gaze from the at least one face; and
generating at least one region of interest of the omnidirectional image based at least on the at least one gaze,
wherein the at least one second region of interest corresponds to a region where the at least one gaze is oriented in a spherical space onto which the omnidirectional image is mapped.

* * * * *